C. M. KENTZINGER.
SHOCK ABSORBER FOR VEHICLES.
APPLICATION FILED MAR. 13, 1908.
913,396.
Patented Feb. 23, 1909.
2 SHEETS—SHEET 1.
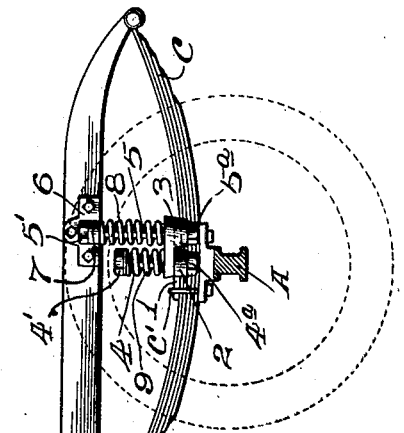
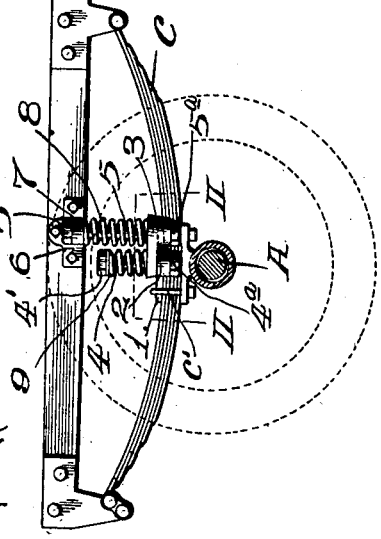
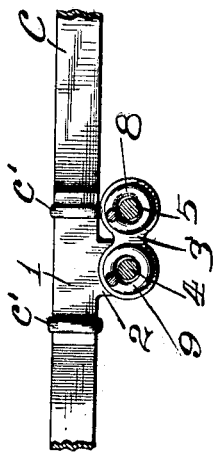

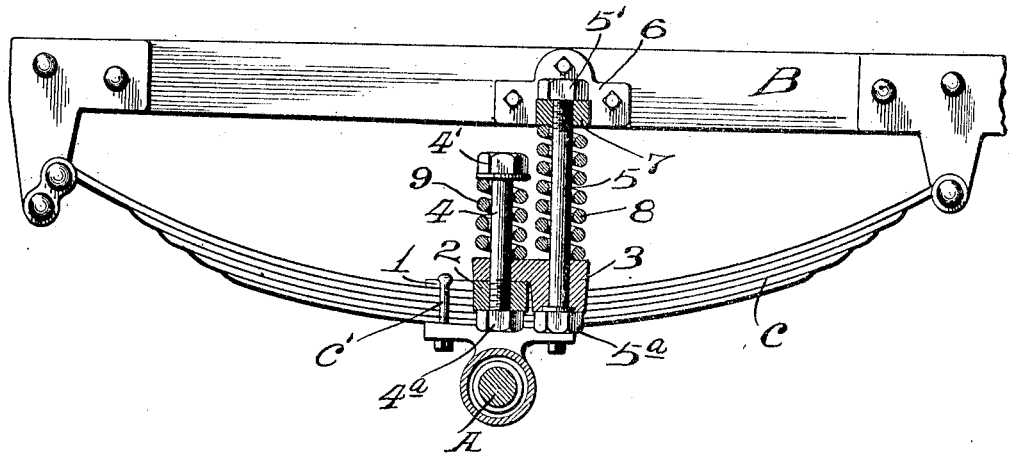
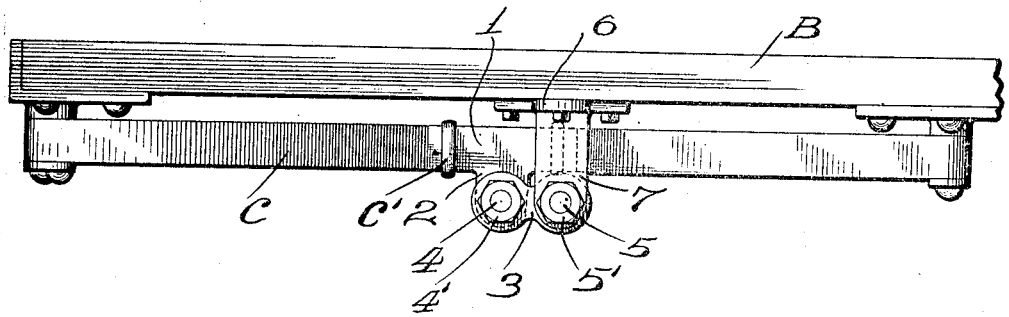

UNITED STATES PATENT OFFICE.

CLEMENT M. KENTZINGER, OF ST. LOUIS, MISSOURI.

SHOCK-ABSORBER FOR VEHICLES.

No. 913,396.

Specification of Letters Patent.

Patented Feb. 23, 1909.

Application filed March 13, 1908. Serial No. 420,904.

To all whom it may concern:

Be it known that I, CLEMENT M. KENTZINGER, a citizen of the United States of America, residing at the city of St. Louis, in the State of Missouri, have invented certain new and useful Improvements in Shock-Absorbers for Vehicles, of which the following is a full, clear, and exact description, reference being had to the accompanying drawings, forming part of this specification.

My invention relates to a device for absorbing the shocks received by the ground wheels of vehicles and whereby such shocks are prevented from being transferred to the bodies of the vehicles to an objectionable degree.

Figure I is a view partly in side elevation, and partly in vertical section of the body frame and running gear of a vehicle with two of my shock absorbers in positions for use. Fig. II is a horizontal section taken on line II—II, Fig. I. Fig. III is an enlarged view partly in elevation of portions of a vehicle and partly in vertical section taken through my shock absorber. Fig. IV is a top or plan view of the parts shown in Fig. III.

In the accompanying drawings: A designates the axles of a vehicle, B the vehicle body frame, and C the ordinary body frame supporting springs that are supported by the axles A.

1 designates a main fixed bearer that is mounted upon the ordinary spring C and may be held thereto by the usual spring holding shackles C'. This bearer is provided with an arm 2 that extends laterally from and transversely of the spring C, thereby furnishing a bearer portion that is offset from said spring.

3 is an auxiliary offset bearer extending parallel with the spring C and adapted to rest in part upon the offset arm of the main bearer 1, and is provided with a vertical aperture that receives a guide rod 4, seated in the offset arm 2 of the main bearer and extending vertically therefrom. The auxiliary offset bearer 3 is free of connection to the offset arm of the main bearer and is adapted to play vertically above said offset arm upon the guide rod 4.

5 designates a second guide rod that is fitted in the auxiliary offset bearer 3 aside from the offset arm of the main bearer and which extends vertically from said auxiliary offset bearer and parallel with the guide rod 4.

6 is a bracket fixed to the vehicle body frame B and which is provided with an arm 7 that extends laterally from said body frame transversely of the spring C and the auxiliary offset bearer 3, in a position to receive the guide rod 5 which is loosely seated in an aperture in said bracket arm.

8 and 9 are cushion springs located respectively around the guide rods 5 and 4, the cushion spring 8 being interposed between the auxiliary offset bearer 3 and the bracket arm 7, and the spring 9 being interposed between the auxiliary offset bearer 3 and the head 4' at the upper end of the guide rod 4.

The guide rod 4 is provided at its lower end, beneath the arm of the main bearer, with a head or nut 4ª that serves to limit the degree of upward movement of said guide rod. The guide rod 5 is provided at its upper and lower ends with heads or nuts 5' and 5ª.

When in the practical use of my shock absorber a ground wheel of a vehicle is subjected to a blow by impact with an obstruction, the following actions take place: The force of the blow is transmitted to the vehicle axle and the vehicle body frame descends, and as said body frame moves downwardly its movement is yieldingly resisted by the cushion spring 8 during which the bracket arm 7 resting on said spring moves in sliding engagement with the guide rod 5. Then, as re-bound of the vehicle body frame occurs, subsequent to the descent of the frame, the bracket arm 7 moves upwardly until it engages the head 5' of the guide rod 5, and after such engagement has taken place a continued movement of the body frame and bracket arm causes the auxiliary offset bearer 3 to be elevated and travel in sliding engagement with the guide rod 4. As the auxiliary offset bearer rises it acts to compress the cushion spring 9, situated around the guide rod 4, and said cushion spring by its yielding resistance to the upward movement of the auxiliary offset bearer acts to take up any shock incident to the re-bound of the body frame. It is obvious that after the actions set forth have taken place the two cushion springs 8 and 9 will act in conjunction with each other, until the power in the two springs has become equalized and the parts of the shock absorber have resumed their normal positions.

I claim:

The combination, with an axle, body frame, and body frame supporting spring mounted upon the axle; of a main bearer, having an offset arm and mounted upon the spring, an auxiliary offset bearer extending parallel with the spring, an upwardly extending main guide rod having a head and passed through the inner end of the auxiliary offset arm and secured to the offset arm of the main bearer, a cushion spring surrounding the upwardly extending guide rod, between the head of the latter and the inner end of the auxiliary offset bearer, a bracket having a laterally extending arm and secured to the body frame, an auxiliary guide rod having a head and passed through the outer end of the auxiliary bearer arm and secured to the bracket arm and a cushion spring surrounding the auxiliary guide rod between the outer end of the auxiliary bearer and the bracket arm.

CLEMENT M. KENTZINGER.

In presence of—
BLANCHE HOGAN,
LILY ROST.